United States Patent [19]
Ko

[11] Patent Number: 5,698,996
[45] Date of Patent: *Dec. 16, 1997

[54] DATA PROCESSING WITH SELF-TIMED FEATURE AND LOW POWER TRANSITION DETECTION

[75] Inventor: Uming Ko, Plano, Tex.

[73] Assignee: Texas Instruments Incorporated, Dallas, Tex.

[*] Notice: The term of this patent shall not extend beyond the expiration date of Pat. No. 5,475,320.

[21] Appl. No.: 692,795

[22] Filed: Aug. 1, 1996

Related U.S. Application Data

[63] Continuation of Ser. No. 309,825, Sep. 21, 1994, abandoned.
[51] Int. Cl.$^6$ .................................................. H03K 19/096
[52] U.S. Cl. .................................................. 326/93; 326/21
[58] Field of Search .................................. 326/21, 53, 93, 326/95, 98, 83; 327/142, 143, 384, 386, 387; 365/233.5; 395/275, 551, 552

[56] References Cited

U.S. PATENT DOCUMENTS

| | | | |
|---|---|---|---|
| 3,925,652 | 12/1975 | Miller | 326/53 |
| 4,039,858 | 8/1977 | Stewart | 326/52 |
| 4,692,635 | 9/1987 | Rapp | 327/78 |
| 4,775,840 | 10/1988 | Ohmori et al. | 326/21 |
| 4,940,904 | 7/1990 | Lin | 327/142 |
| 5,121,003 | 6/1992 | Williams . | |
| 5,124,584 | 6/1992 | McClure | 365/233.5 |
| 5,194,768 | 3/1993 | Lozano | 326/21 |

FOREIGN PATENT DOCUMENTS 0 558 079 A2   9/1993   European Pat. Off. .

OTHER PUBLICATIONS

A. De Gloria, et al., "Delay insensitive mirco–pipelined combinational logic". Microprocessing and Microprogramming, vol. 36, No. 5, 1 Oct. 193, pp. 225–241.

M. A. Franklin, et al., "Clocked and Asynchronous Instruction Pipelines", Processings of the 26th Annual Inernational Symposium on Microarchitecture, 1–3 Dec. 1993, Austin, Texas, pp. 17–184.

John Compton and Alexander Albicki, "Self–Timed Pipeline with Adder," Dept. of Electrical Engineering, University of Rochester, IEEE 1992, pp. 109–113.

Y.K. Tan and Y.C. Lim, "Self–Timed Precharge Latch," Electrical Engineering Dept., National University of Singapore, Kent Ridge, Singapore 0511, 1990 IEEE, pp. 566–569.

Gordon M. Jacobs and Robert W. Brodersen, "A Fully Asynchronous Digital Signal Processor Using Self–Timed Circuits," IEEE Journal of Solid–State Circuits, vol. 25, No. 6, Dec. 1990, pp. 1526–1536.

Ted E. Williams, "Analying and Improving Latency and Throughput in Self–Timed Pipelines and Rings," HaL Computer Systems, Stanford University, pp. 1–10, IEEE 1992.

*Primary Examiner*—Edward P. Westin
*Assistant Examiner*—Benjamin D. Driscoll
*Attorney, Agent, or Firm*—Scott B. Stahl; W. James Brady; Richard L. Donaldson

[57] ABSTRACT

A technique is provided for signaling to a first data processing circuit that an output of a second data processing circuit is ready for processing by the first data processing circuit. An occurrence of a logic transition at an input of the second data processing circuit is detected, and a latch circuit is used to produce a detection signal indicative of the occurrence. In response to the logic transition, the output of the second data processing circuit is produced, and this output is provided to the first data processing circuit. In response to production of the detection signal, and after delaying for an amount of time adequate to permit the second data processing circuit to produce its output, a done signal is sent to the first data processing circuit.

14 Claims, 1 Drawing Sheet

DATA PROCESSING WITH SELF-TIMED FEATURE AND LOW POWER TRANSITION DETECTION

This application is a Continuation of application Ser. No. 08/309,825, filed Sep. 21, 1994, abandoned.

CROSS-REFERENCE TO RELATED APPLICATION

The subject matter of this application is related to subject matter disclosed in the co-assigned, copending application entitled "Data Processing With a Self-Timed Approach to Spurious Transitions," filed on Aug. 11, 1994, Attorney Docket No. TI-19336.

Field of the Invention

The present invention relates to the application of self-timed concepts in data processing and, more particularly, to transition detection in data processing applications in which low power consumption is important.

Background of the Invention

Data processing systems are used in myriad applications which touch virtually every aspect of life. In applications where the data processing system uses battery power for any substantial length of time, it is particularly desirable to be able to minimize the power consumption of the data processing system. Examples of systems wherein battery power is used for substantial periods of time include portable data processing systems such as notebook and sub-notebook computer systems, and data processing systems which are employed in remote locations, hazardous weather areas, or earthquake prone areas. In data processing systems that utilize self-timed concepts, and as further discussed below, transition detectors are an important factor in power consumption.

In conventional data processing systems that implement self-timed concepts, the size of the transition detector increases with the size of the associated data processing circuitry, thus adversely impacting the system in terms of both size and power consumption.

It is therefore desirable to provide, in a data processing system that implements self-timed concepts, a transition detector whose size is independent of the associated data processing circuitry.

The present invention provides, in a data processing system that implements self-timed concepts, a transition detector whose size is independent of the size of the associated data processing circuitry.

DETAILED DESCRIPTION OF THE INVENTION

Figure 1:
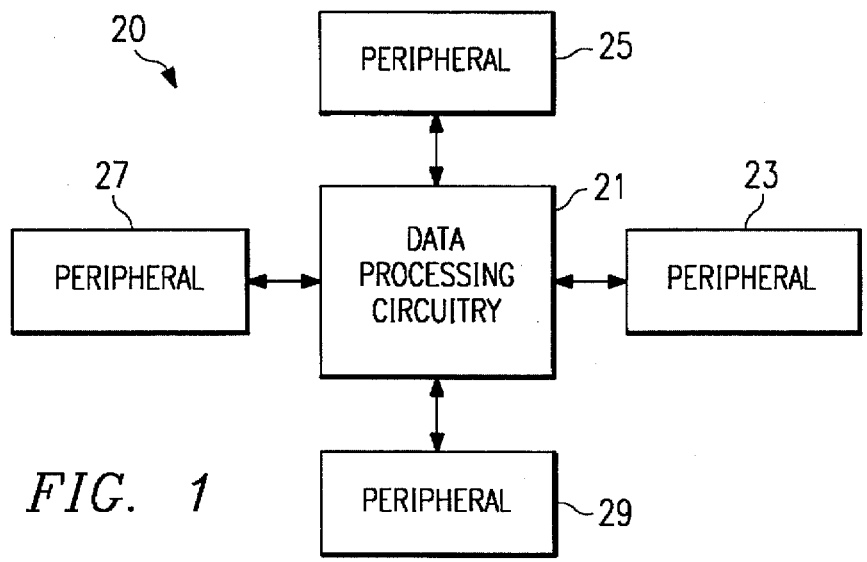
FIG. 1 is a block diagram of a data processing system according to the present invention.

FIG. 1 is a block diagram of a data processing system 20 according to the present invention. The data processing system 20 includes data processing circuitry 21, and peripheral devices 23, 25, 27 and 29. In the exemplary embodiment of FIG. 1, the data processing circuitry 21 is connected to each of the peripheral circuitries 23, 25, 27 and 29 for transfer of information between data processing circuitry 21 and peripheral circuitries 23, 25, 27 and 29. However, and as will be apparent from the following description, a data processing system according to the present invention could include any quantity and type of peripheral circuitries and peripheral devices (such as peripherals 23, 25, 27 and 29) interconnected among themselves and with data processing circuitry 21 in any manner heretofore or hereafter conceivable to workers in the art. Examples are: data processing circuitry 21, a microprocessor; peripheral 23, a memory control unit for accessing a DRAM; peripheral 25, a bus control unit; peripheral 27, a non-volatile memory such as ROM or EPROM; and peripheral 29, a graphics control unit for interfacing with a graphics display unit. Other examples are: data processing circuitry 21, an adder circuit module; peripheral 23, an on-chip cache; peripheral 25, an execution/load-store unit; and peripheral 27, a branch offset.

Figure 2:
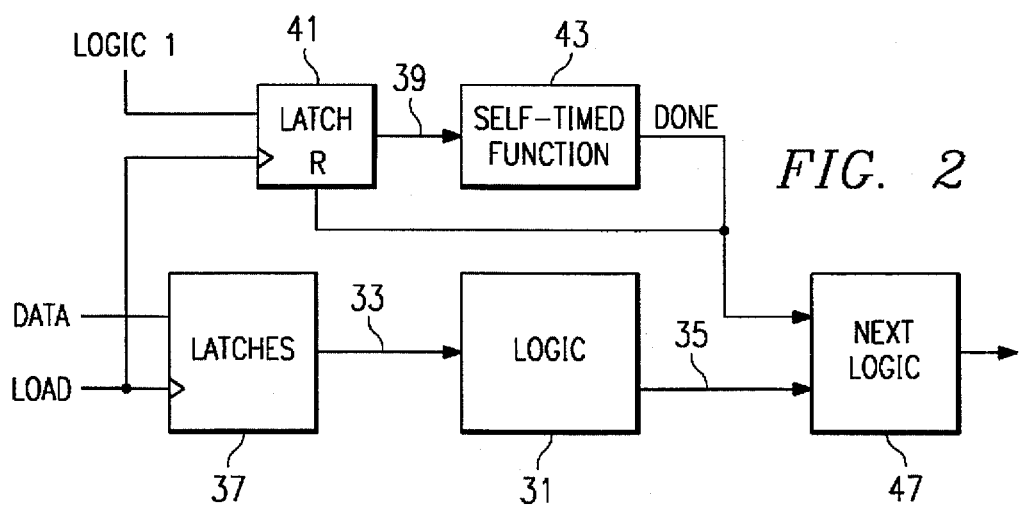
FIG. 2 is a block diagram of a portion of the data processing circuitry of FIG. 1.

FIG. 2 illustrates in more detail a portion of the data processing circuitry 21 of FIG. 1. Data processing logic at 31 receives inputs at 33 and performs data processing operations in response thereto to provide outputs at 35 which are input to the next block of data processing logic 47. The inputs 33 are driven by the outputs of latching circuitry 37. The inputs of latching circuitry 37 are connected to the data to be processed by data processing logic 31. The load signal clocks the latches of latching circuitry 37 so that the desired data is provided at the inputs 33 of data processing logic 31. Once the desired data has been latched through latching circuitry 37 to the inputs 33 of data processing logic 31, then data processing logic 31 provides outputs at 35 in response to the inputs at 33. Data processing logic 31 requires an amount of time, referred to herein as processing time, before the outputs 35 are provided in response to the inputs 33. Thus, after the inputs 33 have been latched through latching circuitry 37, the outputs 35 are not available for use by the next logic block 47 until the processing time associated with logic block 31 has elapsed. Once the processing time has elapsed, then logic 31 has completed its data processing operations and the outputs at 35 are ready and available for input to the next logic block 47. Thus, although the next logic block 47 must wait until the processing time has elapsed before beginning its data processing operations, it is desirable from a performance standpoint to enable logic block 47 to begin its data processing operations as soon as the outputs 35 from logic 31 are available and ready.

In order to permit the logic block 47 to begin its data processing operation as soon as possible, a transition detector, embodied by latch circuit 41 in FIG. 2, and circuitry for implementing a self-timed function 43 are provided. The transition detector 41 is a single latch circuit, for example a D type flip-flop, having its data input connected to logic 1 and having its clock input connected to the load signal. Thus, when a transition occurs at one of the logic inputs 33 by virtue of clocking new data through the latching circuitry 37 in response to the load signal, the latch circuit 41 also clocks logic 1 through to its data output in response to the load signal. The data output of latch circuit 41 thus serves as a transition detection signal 39 which is input to the self-timed circuitry 43. The self-timed function at 43 is designed to account for the processing time associated with data processing logic 31. Thus, upon receiving the transition detection signal 39 from the transition detector latch 41, the self-timed function 43 thereafter outputs a done signal when the processing time has elapsed. The next block of data processing logic 47 receives the done signal and responds thereto by beginning its data processing operation on the outputs 35 provided by data processing logic 31, which outputs 35 are now ready and available for processing by data processing logic By virtue of the done signal produced by the self-timed function 43, the data processing logic 47 can begin its data processing operation as soon as possible after the outputs 35 are available and ready (that is, after the processing time of data processing logic 31 has elapsed). The done signal is also fed back to the reset input of transition detector latch 41 so that the transition detection signal 39 goes low again when the done signal goes high. Only a single latch circuit 41, for example a single register bit or a single flip flop, is required to produce the transition detection signal 39, regardless of the size of data processing logic 31 or the member of inputs thereto at 33. This is advantageous both from a power consumption standpoint and an integrated circuit area standpoint.

Figure 3:
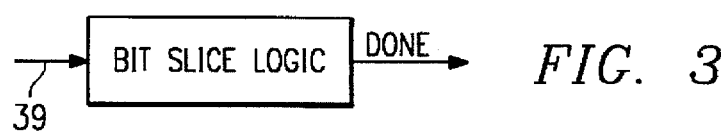
FIG. 3 illustrates one embodiment of the self-timed function of FIG. 2.

FIG. 3 illustrates one example of the self-timed function 43 of FIG. 2. In FIG. 3, the self-timed function is implemented with bit-slice logic which is literally a duplicate of the worst case path, timewise, through the data processing logic circuitry 31. For example, in a 32-bit parallel adder having a pair of 32-bit inputs, the worst case path would be the path of the most significant bit of either 32-bit input. Thus, the logic of the path of the most significant input bit is literally duplicated in the bit-slice logic of the FIG. 3 self-timed function.

Figure 4:
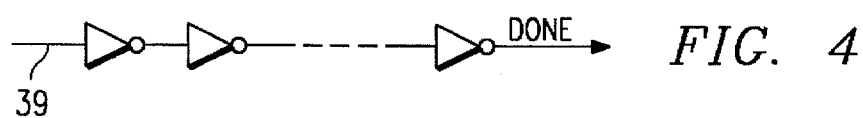
FIG. 4 illustrates another embodiment of the self-timed function of FIG. 2.

FIG. 4 illustrates another example of the self-timed function 43 of FIG. 2. In FIG. 4, a chain of inverters is arranged so as to mimic the processing delay time of the bit-slice logic of FIG. 3. Although inverters are illustrated in FIG. 4, a chain of other suitable delay elements will also suffice. The self-timed function of FIG. 4 will generally approximate the processing time of data processing logic 31 less accurately than the bit-slice logic of FIG. 3, but the arrangement of FIG. 4 is typically less costly in terms of power consumption and integrated circuit area.

Although exemplary embodiments of the present invention are described above, this does not limit the scope of the invention, which can be practiced in a variety of embodiments.

What is claimed is:

1. A data processing device, comprising:
   first data processing circuitry having a plurality of inputs and responsive to a logic transition at one of said inputs to produce, after a processing time has elapsed since said input logic transition, an output;
   a transition detector for detecting an occurrence of a logic transition at any of said inputs and producing a detection signal indicative of said occurrence, said transition detector including a latch circuit having an output for producing said detection signal;
   a self-timed circuit connected to said latch circuit output for receiving said detection signal and, after delaying for an amount of time which approximates said processing time, producing a done signal; and
   second data processing circuitry having a data input connected to said output of said first data processing circuitry and having a control input for receiving said done signal from said self-timed circuit, said second data processing circuitry responsive to said done signal to begin processing data received at said data input thereof from said first data processing circuitry.

2. The device of claim 1, including latching circuitry for applying said logic transitions to said inputs of said first data processing circuitry, said latching circuitry having a clock input connected to a clock signal, said clock signal also connected to a clock input of said latch circuit of said transition detector.

3. The device of claim 2, wherein said latch circuit of said transition detector includes a data input connected to a fixed logic level.

4. The device of claim 3, wherein said latch circuit of said transition detector includes a reset input connected to said done signal.

5. The device of claim 1, wherein said latch circuit of said transition detector includes a reset input connected to said done signal.

6. The device of claim 1, wherein said first data processing circuitry includes a parallel adder circuit.

7. A data processing system, comprising:
   data processing circuitry for performing data processing operations on data;
   peripheral circuitry connected to said data processing circuitry for communication with said data processing circuitry; and
   said data processing circuitry including a first data processing circuit having a plurality of inputs and responsive to a logic transition at one of said inputs to produce, after a processing time has elapsed since said input logic transition, an output, a transition detector for detecting an occurrence of a logic transition at any of said inputs and producing a detection signal indicative of said occurrence, said transition detector including a latch circuit having an output for producing said detection signal, a self-timed circuit connected to said latch circuit output for receiving said detection signal and, after delaying for an amount of time which approximates said processing time, producing a done signal, and a second data processing circuit having a data input connected to said output of said first data processing circuit and having a control input for receiving said done signal from said self-timed circuit, said second data processing circuit responsive to said done signal to begin processing data received at said data input thereof from said first data processing circuit.

8. The system of claim 7, wherein said data processing circuitry includes latching circuitry for applying said logic transitions to said inputs of said first data processing circuit, said latching circuitry having a clock input connected to a clock signal, said clock signal also connected to a clock input of said latch circuit of said transition detector.

9. The system of claim 8, wherein said latch circuit of said transition detector includes a data input connected to a fix logic level.

10. The system of claim 9, wherein said latch circuit of said transition detector includes a reset input connected to said done signal.

11. The system of claim 7, wherein said latch circuit of said transition detector includes a reset input connected to said done signal.

12. The system of claim 7, wherein said first data processing circuit includes a parallel adder circuit.

13. A method of signaling to a first data processing circuit that an output of a second data processing circuit is ready at a data input of said first data processing circuit for process ing by said first data processing circuit, comprising the steps of:

detecting an occurrence of a logic transition at an input of the second data processing circuit, and using a latch circuit to produce a detection signal indicative of said occurrence;

in response to said logic transition, producing said output of said second data processing circuit and providing said output at said data input of said first data processing circuit; and in response to production of said detection signal, delaying for an amount of time adequate to permit said second data processing circuit to produce said output, and thereafter sending a done signal to a control input of said first data processing circuit.

14. The method of claim 13, including using latching circuitry to apply said logic transition to said input of said second data processing circuit, and clocking said latching circuitry and said latch circuit with a single clock signal.

* * * * *